(12) United States Patent
Foulger et al.

(10) Patent No.: US 8,156,499 B2
(45) Date of Patent: Apr. 10, 2012

(54) METHODS, SYSTEMS AND ARTICLES OF MANUFACTURE FOR SCHEDULING EXECUTION OF PROGRAMS ON COMPUTERS HAVING DIFFERENT OPERATING SYSTEMS

(75) Inventors: Michael G. Foulger, Novato, CA (US); Thomas R. Chipperfield, Petaluma, CA (US); Jeremy S. Cooper, Petaluma, CA (US)

(73) Assignee: ICP Acquisition Corporation, San Jose, CA (US)

( * ) Notice: Subject to any disclaimer, the term of this patent is extended or adjusted under 35 U.S.C. 154(b) by 0 days.

(21) Appl. No.: 12/331,980

(22) Filed: Dec. 10, 2008

(65) Prior Publication Data
US 2009/0094541 A1 Apr. 9, 2009

Related U.S. Application Data

(63) Continuation of application No. 09/840,923, filed on Apr. 25, 2001, now Pat. No. 7,469,405.

(60) Provisional application No. 60/199,401, filed on Apr. 25, 2000.

(51) Int. Cl.
*G06F 9/46* (2006.01)
*G06F 15/16* (2006.01)

(52) U.S. Cl. .......... 718/102; 718/100; 709/201

(58) Field of Classification Search .......... 718/100, 718/102; 709/201
See application file for complete search history.

(56) References Cited

U.S. PATENT DOCUMENTS

| | | | |
|---|---|---|---|
| 5,107,443 A | 4/1992 | Smith et al. | |
| 5,164,897 A | 11/1992 | Clark et al. | |
| 5,265,033 A | 11/1993 | Vajk et al. | |
| 5,321,835 A * | 6/1994 | Tanaka et al. | 718/101 |
| 5,414,845 A * | 5/1995 | Behm et al. | 718/104 |
| 5,457,797 A * | 10/1995 | Butterworth et al. | 719/320 |
| 5,532,838 A | 7/1996 | Barbari | |
| 5,551,024 A | 8/1996 | Waters | |
| 5,583,995 A | 12/1996 | Gardner et al. | |
| 5,706,502 A | 1/1998 | Foley et al. | |
| 5,781,901 A | 7/1998 | Kuzma | |
| 5,793,972 A | 8/1998 | Shane | |

(Continued)

FOREIGN PATENT DOCUMENTS

EP  0989501 A2  9/1999

(Continued)

OTHER PUBLICATIONS

Antonioletti, Mario "Load Sharing Across Networked Computers", Dec. 1997, The University of Ediburgh, version 1.0, p. 1-34.

(Continued)

*Primary Examiner* — Kenneth Tang
(74) *Attorney, Agent, or Firm* — Sterne, Kessler, Goldstein & Fox PLLC

(57) ABSTRACT

A distributed computing system includes at least first and second distinct computers each having a different operating system. First processes are compatible with the first operating system and second processes are compatible with the second operating system. A third scheduling computer, coupled to the first and second computer via a communication network, includes a scheduler for scheduling the first processes and the second processes to execute respectively on the first and second computers. The scheduler accesses a master schedule that defines an executing sequence of the first processes and the second processes. The master schedule can define conditional inter-relationships between the first processes and the second processes.

22 Claims, 7 Drawing Sheets

U.S. PATENT DOCUMENTS

| | | | |
|---|---|---|---|
| 5,796,952 A | 8/1998 | Davis et al. | |
| 5,799,309 A | 8/1998 | Srinivasan | |
| 5,808,566 A | 9/1998 | Behr | |
| 5,812,843 A * | 9/1998 | Yamazaki et al. | 718/100 |
| 5,818,447 A | 10/1998 | Wolf et al. | |
| 5,832,497 A | 11/1998 | Taylor | |
| 5,850,618 A | 12/1998 | Suetsugu et al. | |
| 5,870,552 A | 2/1999 | Dozier et al. | |
| 5,870,604 A * | 2/1999 | Yamagishi | 718/105 |
| 5,875,175 A | 2/1999 | Sherer et al. | |
| 5,908,465 A | 6/1999 | Ito et al. | |
| 5,933,811 A | 8/1999 | Angles et al. | |
| 5,937,162 A | 8/1999 | Funk et al. | |
| 5,966,695 A | 10/1999 | Melchione et al. | |
| 5,970,062 A | 10/1999 | Bauchot | |
| 5,978,799 A | 11/1999 | Hirsch | |
| 5,999,912 A | 12/1999 | Wodarz et al. | |
| 6,006,225 A | 12/1999 | Bowman et al. | |
| 6,009,455 A * | 12/1999 | Doyle | 709/201 |
| 6,009,462 A | 12/1999 | Birrell et al. | |
| 6,018,518 A | 1/2000 | Smallwood et al. | |
| 6,021,406 A | 2/2000 | Kuznetsov | |
| 6,031,533 A | 2/2000 | Peddada et al. | |
| 6,049,776 A | 4/2000 | Donnelly et al. | |
| 6,055,510 A | 4/2000 | Henrick et al. | |
| 6,070,190 A * | 5/2000 | Reps et al. | 709/224 |
| 6,073,075 A | 6/2000 | Kondou et al. | |
| 6,085,244 A | 7/2000 | Wookey | |
| 6,091,777 A | 7/2000 | Guetz et al. | |
| 6,094,507 A | 7/2000 | Monden | |
| 6,101,485 A | 8/2000 | Fortenberry et al. | |
| 6,170,011 B1 | 1/2001 | Macleod Beck et al. | |
| 6,182,129 B1 | 1/2001 | Rowe et al. | |
| 6,188,398 B1 | 2/2001 | Collins-Rector et al. | |
| 6,222,825 B1 | 4/2001 | Mangin et al. | |
| 6,233,520 B1 | 5/2001 | Ito et al. | |
| 6,256,627 B1 | 7/2001 | Beattie et al. | |
| 6,263,020 B1 | 7/2001 | Gardos et al. | |
| 6,275,575 B1 | 8/2001 | Wu | |
| 6,282,540 B1 | 8/2001 | Goldensher et al. | |
| 6,289,340 B1 | 9/2001 | Puram et al. | |
| 6,321,265 B1 | 11/2001 | Najork et al. | |
| 6,346,980 B1 | 2/2002 | Tani et al. | |
| 6,351,755 B1 | 2/2002 | Najork et al. | |
| 6,353,845 B1 * | 3/2002 | Torzewski et al. | 718/102 |
| 6,360,254 B1 | 3/2002 | Linden et al. | |
| 6,363,377 B1 | 3/2002 | Kravets et al. | |
| 6,377,936 B1 | 4/2002 | Henrick et al. | |
| 6,381,579 B1 | 4/2002 | Gervais et al. | |
| 6,397,219 B2 | 5/2002 | Mills | |
| 6,401,075 B1 | 6/2002 | Mason et al. | |
| 6,446,111 B1 | 9/2002 | Lowery | |
| 6,449,635 B1 | 9/2002 | Tilden, Jr. et al. | |
| 6,462,676 B1 | 10/2002 | Koizumi | |
| 6,466,940 B1 | 10/2002 | Mills | |
| 6,523,021 B1 | 2/2003 | Monberg et al. | |
| 6,539,080 B1 | 3/2003 | Bruce et al. | |
| 6,549,950 B2 | 4/2003 | Lytle et al. | |
| 6,556,919 B2 | 4/2003 | Suzuki et al. | |
| 6,560,243 B1 | 5/2003 | Mogul | |
| 6,578,022 B1 | 6/2003 | Foulger et al. | |
| 6,587,832 B1 | 7/2003 | Beck et al. | |
| 6,594,666 B1 | 7/2003 | Biswas et al. | |
| 6,606,613 B1 | 8/2003 | Altschuler | |
| 6,606,660 B1 | 8/2003 | Bowman-Amuah | |
| 6,618,747 B1 | 9/2003 | Flynn et al. | |
| 6,625,581 B1 | 9/2003 | Perkowski | |
| 6,657,558 B2 | 12/2003 | Horita et al. | |
| 6,662,194 B1 | 12/2003 | Joao | |
| 6,668,281 B1 | 12/2003 | Ayyadurai | |
| 6,681,255 B1 | 1/2004 | Cooper et al. | |
| 6,694,353 B2 | 2/2004 | Sommerer | |
| 6,721,759 B1 | 4/2004 | Rising | |
| 6,721,784 B1 | 4/2004 | Leonard et al. | |
| 6,727,927 B1 | 4/2004 | Dempski et al. | |
| 6,751,606 B1 | 6/2004 | Fries et al. | |
| 6,766,348 B1 * | 7/2004 | Combs et al. | 718/104 |
| 6,785,679 B1 | 8/2004 | Dane et al. | |
| 6,791,943 B1 | 9/2004 | Reynolds | |
| 6,829,764 B1 * | 12/2004 | Cohen et al. | 718/103 |
| 6,829,780 B2 | 12/2004 | Kraft et al. | |
| 6,854,007 B1 | 2/2005 | Hammond | |
| 7,007,010 B2 | 2/2006 | Cooper | |
| 7,047,423 B1 | 5/2006 | Maloney et al. | |
| 7,065,555 B2 | 6/2006 | Foulger et al. | |
| 7,072,888 B1 | 7/2006 | Perkins | |
| 7,103,580 B1 | 9/2006 | Batachia et al. | |
| 7,287,271 B1 | 10/2007 | Riggins | |
| 7,383,355 B1 * | 6/2008 | Berkman et al. | 709/246 |
| 7,386,594 B2 | 6/2008 | Foulger et al. | |
| 7,401,122 B2 | 7/2008 | Chen | |
| 7,401,155 B2 | 7/2008 | Cooper et al. | |
| 7,469,405 B2 | 12/2008 | Foulger et al. | |
| 7,475,346 B1 | 1/2009 | Bullock et al. | |
| 7,693,950 B2 | 4/2010 | Foulger et al. | |
| 7,730,008 B2 | 6/2010 | Foulger et al. | |
| 7,783,621 B2 | 8/2010 | Cooper | |
| 7,949,748 B2 | 5/2011 | Cooper et al. | |
| 8,015,047 B2 | 9/2011 | Foulger et al. | |
| 8,055,605 B2 | 11/2011 | Foulger et al. | |
| 2001/0011226 A1 | 8/2001 | Greer et al. | |
| 2001/0020195 A1 * | 9/2001 | Patel et al. | 700/121 |
| 2001/0039508 A1 | 11/2001 | Nagler et al. | |
| 2001/0042000 A1 | 11/2001 | Defoor, Jr. | |
| 2001/0047297 A1 | 11/2001 | Wen | |
| 2001/0054043 A1 | 12/2001 | Harlan | |
| 2002/0004733 A1 | 1/2002 | Addante | |
| 2002/0004753 A1 | 1/2002 | Perkowski | |
| 2002/0016730 A1 | 2/2002 | Foulger et al. | |
| 2002/0016809 A1 | 2/2002 | Foulger et al. | |
| 2002/0032738 A1 | 3/2002 | Foulger et al. | |
| 2002/0059226 A1 | 5/2002 | Cooper | |
| 2002/0073343 A1 | 6/2002 | Ziskind et al. | |
| 2002/0082923 A1 | 6/2002 | Merriman et al. | |
| 2002/0103698 A1 | 8/2002 | Cantrell | |
| 2002/0147637 A1 | 10/2002 | Kraft et al. | |
| 2002/0152238 A1 | 10/2002 | Hayes | |
| 2002/0156779 A1 | 10/2002 | Elliott et al. | |
| 2003/0037158 A1 | 2/2003 | Yano et al. | |
| 2003/0046148 A1 | 3/2003 | Rizzi et al. | |
| 2003/0128297 A1 | 7/2003 | Chu | |
| 2003/0140172 A1 * | 7/2003 | Woods et al. | 709/248 |
| 2003/0145100 A1 | 7/2003 | Marchetto et al. | |
| 2003/0229638 A1 | 12/2003 | Carpenter et al. | |
| 2004/0010484 A1 | 1/2004 | Foulger et al. | |
| 2004/0210589 A1 | 10/2004 | Cooper et al. | |
| 2004/0220821 A1 | 11/2004 | Ericsson et al. | |
| 2005/0171863 A1 | 8/2005 | Hagen | |
| 2005/0283503 A1 | 12/2005 | Hancock et al. | |
| 2005/0289005 A1 | 12/2005 | Ferber et al. | |
| 2006/0085263 A1 | 4/2006 | Greer et al. | |
| 2006/0129536 A1 | 6/2006 | Foulger et al. | |
| 2007/0016562 A1 | 1/2007 | Cooper | |
| 2007/0022170 A1 | 1/2007 | Foulger et al. | |
| 2007/0150804 A1 | 6/2007 | Foulger et al. | |
| 2007/0204219 A1 | 8/2007 | Foulger et al. | |
| 2008/0244027 A1 | 10/2008 | Foulger et al. | |
| 2008/0270604 A1 | 10/2008 | Cooper et al. | |
| 2010/0223275 A1 | 9/2010 | Foulger et al. | |

FOREIGN PATENT DOCUMENTS

| | | |
|---|---|---|
| JP | 07200509 A | 8/1995 |
| JP | 08221479 A | 8/1996 |
| JP | 09130861 | 5/1997 |
| JP | 2000 020421 | 1/2000 |
| WO | WO 97/07467 | 2/1997 |
| WO | PCT/US97/19719 A2 | 10/1997 |
| WO | WO 98/20434 | 5/1998 |
| WO | PCT/US97/22151 | 6/1998 |
| WO | WO 98/27696 A1 | 6/1998 |
| WO | WO 00/20975 | 4/2000 |
| WO | WO 00/25508 | 5/2000 |
| WO | WO 01/13069 A1 | 2/2001 |
| WO | WO 01/65426 A1 | 9/2001 |
| WO | WO 01/80177 A2 | 10/2001 |

OTHER PUBLICATIONS

"What is MD5 and Why Do I Care?" by Lance Spitzner http://www.enteract.com/~/spitz/md5.htrnl downloaded Mar. 20, 2000.

The MD5 Message Digest Algorithm by R.Rivest MIT Laboratory for Computer Science and RSA Data Security, Inc. Apr. 1992.

Applied Cryptography Protocols, Algorithms, and Source Code Inc. Schier, Bruce 1996.

Google Launches Full Suite of Fully Automated, Highly Customizable Websearch Services Based on Company's Award-Winning Search Technology Business Wire, p. 0420 Apr. 4, 2000.

RSS Feeds From CNET News.com/CNET News.com http://news.com/2009-1090-980549.html?tag=ne.404 (downloaded May 15, 2006—3 pgs).

http://www.weather.com/services/oap.html?from=servicesindex downloaded May 18, 2006.

Gauch, S. and Smith, John. "Query Reformulation Strategies for an Intelligent Search Intermediary" Proceedings of the AI Systems in Government Conference, IEEE Computer Society ISBN No. 0-8186-1934-1 pp. 65-71 (Mar. 27-31, 1989).

Hsiangchu, Lai et al. A System Architecture of Intelligent-Guided Browsing on the Web, 1998, IEEE, 1060-3425, 1-10.

Jin-gang Kim et al., Intelligent Information Recommend System on the Internet, 1999, IEEE.

Branscum, Deborah "Sites to Help Professional Workers Who Like to Go it Alone", New York Times, Oct. 14, 1999, [retrieved Jun. 23, 2005 from Proquest Direct, pp. 1-3.

Houston, Lori, "IC Planet: Running Perl in the Engine", www.oreilly.com Apr. 10, 2000 [retrieved May 23, 2005 from Google.com p. 1-2].

Clark, Don "E-Business Starting Gate" Wall Street Journal Apr. 24, 2000 [retrieved Jun. 23, 2005 from Proquest Direct p. 1-3].

IBM Technical Disclosure Bulletin, NN8905154, May 1989 2 pgs.

International Search report for Application No. PCT/US01 12648 Nov. 21, 2001, 6 pgs.

Anderson, D., "E-mail or Me-Mail?" The Industry Standard, IDG.net, Printed from http://www.thestandard/com/article/display/0,1151,12422,00.html, 4 pages (Mar. 6, 2000).

Cross, R. and Nassef, A., "E-Mail Direct Marketing Comes of Age," Direct Marketing, Hoke Communications, vol. 62, No. 6, pp. 44-45 (Oct. 1999).

"Top Ten Strategies for Direct Email Success," Boldfish Corporation, Printed from http://www.boldfish.com/BF-emguide/top-ten.html, 7 pages (Jan. 1, 2000).

International Search Report from PCT Application No. PCT/US01/13137, 7 pages, mailed Aug. 28, 2002.

International Search Report from Application No. PCT/US01/13141, 7 pages, mailed Oct. 27, 2003.

Sanad et al. Mobile cellular/GPS/satellite antennas with both single-band and dual-band, Antennas and Propagation Society International Symposium, Jul. 16-20, 2000.

Nagy et al. Geographic Data Processing. ACM Computing Surveys. 1979, p. 139-181.

International Search report for Application No. PCT/US01 12510 Apr. 18, 2001, 6 pgs. mailed Sep. 5, 2002.

Ju, J and Wang Y., "Scheduling PVM Tasks," XP000627434, Operating Systems Review (SIGOPS), ACM Headquarter, New York, NY, vol. 30, No. 3, Jul. 1, 1996, pp. 22-31.

"Mental Ray Specification," XP002195542, <http://www.id8media.com/3s_products/mental_ray2.htm>,[internet], retrieved on Apr. 8, 2002.

Taylor, A., "Press Release—Avid Announces New Release of softimage^3d 3.8sp2," XP002195543, <http://www.softimage.com/community/xsi/discuss/Archives/3dgames.archive.9907/msg0000.htm>, [internet], retrieved on Apr. 8, 2002.

Ganesh, Sathy, Google Groups, "Re: Group Scheduling Software for PC's and mac's", Sep. 22, 1994, Newsgroups: bit.listserv.novell.

Foulger, Michael G., et al. U.S. Appl. No. 09/551,746, filed Apr. 18, 2000 entitled "Method, System, and Computer Program Product for Propagating Remotely Configurable Posters of Host Site Content".

"404 Error page/ CNET News.com" http://news.com/2547-1%203-0-20-.xml (downloaded May 18, 2006) 3 pages.

International Preliminary Examination Report for PCT Application No. PCT/US01/13265, 8 pages, mailed Apr. 22, 2008.

U.S. Appl. No. 60/180,368, Carpenter et al., "Method and Apparatus for Providing Access to Online Employment Information", filed Feb. 4, 2000.

U.S. Appl. No. 60/199,376, Foulger et al., "Method, System, and Computer Program Product for Employment Market Statistics Generation and Analysis", filed Apr. 25, 2000.

International Search Report directed to related International Patent Application No. PCT/US01/12509, mailed Dec. 10, 2003; 5 pages.

Costes, M., et al., "Link Bandwidth Control Using a Hardware Pacing Mechanism", IBM Technical Disclosure Bulletin, May 1989, accessed from ip.com; pp. 1-3.

"Expedia Travel", expedia.msn.com/daily/home/default/hts from Dec. 1998, accessed Jan. 29, 2011 via Archive.org; 6 pages.

Holzer, H., et al., "Jobs Queues and Wages", The Quarterly Journal of Economics, Aug. 1991; pp. 739-766.

Loban, S. R., "A Framework for Computer Assisted Travel Counseling", Annals of Toursim Research, vol. 24, No. 4, 1997; pp. 813-834.

Pischke, J., et al., "Employment Effects of Immigration to Germany: An Analysis Based on Local Labor Markets", The Review of Economics and Statistics, Nov. 1997; pp. 594-604.

"Searching for work that pays: State Findings Idaho", accessed from http://idahocan.org/about/pubs/1999.0101_Searching.For.Work.that.Pays.pdf, Jan. 1999; pp. 23-26 and 39-50.

"Seaside Realty—Vacation Rental/Real Estate—Outer Banks, North Carolina", SeasideRealty.com/book/query.html, dated Mar. 3, 2000, accessed Jan. 29, 2011, via Archive.org; 3 pages.

\* cited by examiner

METHODS, SYSTEMS AND ARTICLES OF MANUFACTURE FOR SCHEDULING EXECUTION OF PROGRAMS ON COMPUTERS HAVING DIFFERENT OPERATING SYSTEMS

CROSS-REFERENCE TO OTHER APPLICATIONS

This application is a continuation of U.S. application Ser. No. 09/840,923, filed Apr. 25, 2001, which claims the benefit of U.S. Provisional Application No. 60/421,780, filed Oct. 29, 2002, each of which is incorporated herein in its entirety by reference.

BACKGROUND OF THE INVENTION

1. Field of the Invention

The present invention relates to a system, method, and computer program product for scheduling the execution of computer processes in a network environment.

2. Related Art

Known distributed computing systems are useful for performing a variety of different computing tasks. "Distributed" refers to physically separated computers that are capable of communicating with one another and/or with a central computer. One such system includes a plurality of distributed computers, wherein each of the computers has its own operating system, which is different from at least one of the other computers. For example, numerous Unix-based computers execute computer programs compatible with Unix, while numerous Microsoft Windows NT based computers execute computer programs compatible with Windows NT. The Unix compatible computer programs can be incompatible with the Windows NT based computers, and vice versa. The Unix and Windows NT compatible programs are collectively referred to as cross-platform processes because the processes collectively execute on plural computer platforms, wherein each computer platform respectively hosts an operating system different from the operating systems hosted by at least one of the other computer platforms.

It is desirable in such a distributed system to coordinate the execution of the computer programs on the distributed computers, so as to achieve one or more useful results. Coordinating the execution of the computer programs requires scheduling the computer programs to execute on the different, incompatible, and distributed Unix and Windows NT based computers. It is desirable to schedule the computer programs to execute in a preferably user defined executing sequence. It is further desirable to schedule the computer programs to execute in a sequence that depends on the execution results produced by executing or executed computer programs. It is even further desirable to define the scheduling sequence and then control the scheduling sequence (that is, the sequence in which the distributed computer programs are executed) from a centralized location and computer.

Therefore, what is needed is a system, method and computer program product for coordinating the execution of the computer programs on distributed computers and having the above-mentioned desirable features.

SUMMARY OF THE INVENTION

The present invention meets the above-mentioned needs and advantageously provides the above-mentioned desired features. The present invention provides a system, method and computer program product for scheduling cross-platform computer programs or processes to execute on distributed computers having operating systems compatible with the processes associated with the computers, each of the computers having an operating system that is different from the operating system of at least one of the other distributed computers.

The present invention advantageously schedules the computer programs to execute on the computers in a user defined executing sequence.

The present invention advantageously schedules the computer programs to execute on the computers in a sequence that depends on the execution results produced by executing or executed computer programs.

In the present invention, the scheduling sequence is defined at a centralized computer that can communicate with each of the distributed computers. Then, the centralized computer controls the scheduling sequence (that is, the sequence in which the distributed computer programs are executed). In the present invention, the centralized computer and the distributed computers are advantageously networked together.

In one embodiment, the present invention provides a system for scheduling the execution of cross-platform computer processes on client computers. The client computers include first and second distinct computers having respective first and second different operating systems. The system includes a process scheduling computer coupled to the first and second computers. The process scheduling computer includes a scheduler that schedules a first process compatible with the first operating system and a second process compatible with the second operating system to respectively execute on the first and second client.

The system also includes a master schedule that is accessible to the scheduler. The master schedule includes a first process identifier identifying the first process and a second process identifier identifying the second process, the first and second process identifiers being linked together to define an executing sequence of the first and second processes, wherein the scheduler schedules the first and second processes to execute on the respective first and second computers according to the defined executing sequence.

The master schedule also includes one or more conditional interrelationships between the first and second processes, wherein the scheduler schedules the first and second processes to execute based on the one or more conditional inter-relationships. The one or more conditional inter-relationships include a success criteria associated with the first process. The scheduler includes means for executing the first process, means for comparing the success criteria to execution results produced by the first process, and means for determining whether the first process executed successfully based on a comparison result produced by the comparing means.

The present invention further provides a method and a computer program product for scheduling computer processes to execute in accordance with the above mentioned system for performing same.

Additional features and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art make and use the invention.

DETAILED DESCRIPTION OF THE PREFERRED EMBODIMENTS

Figure 1:
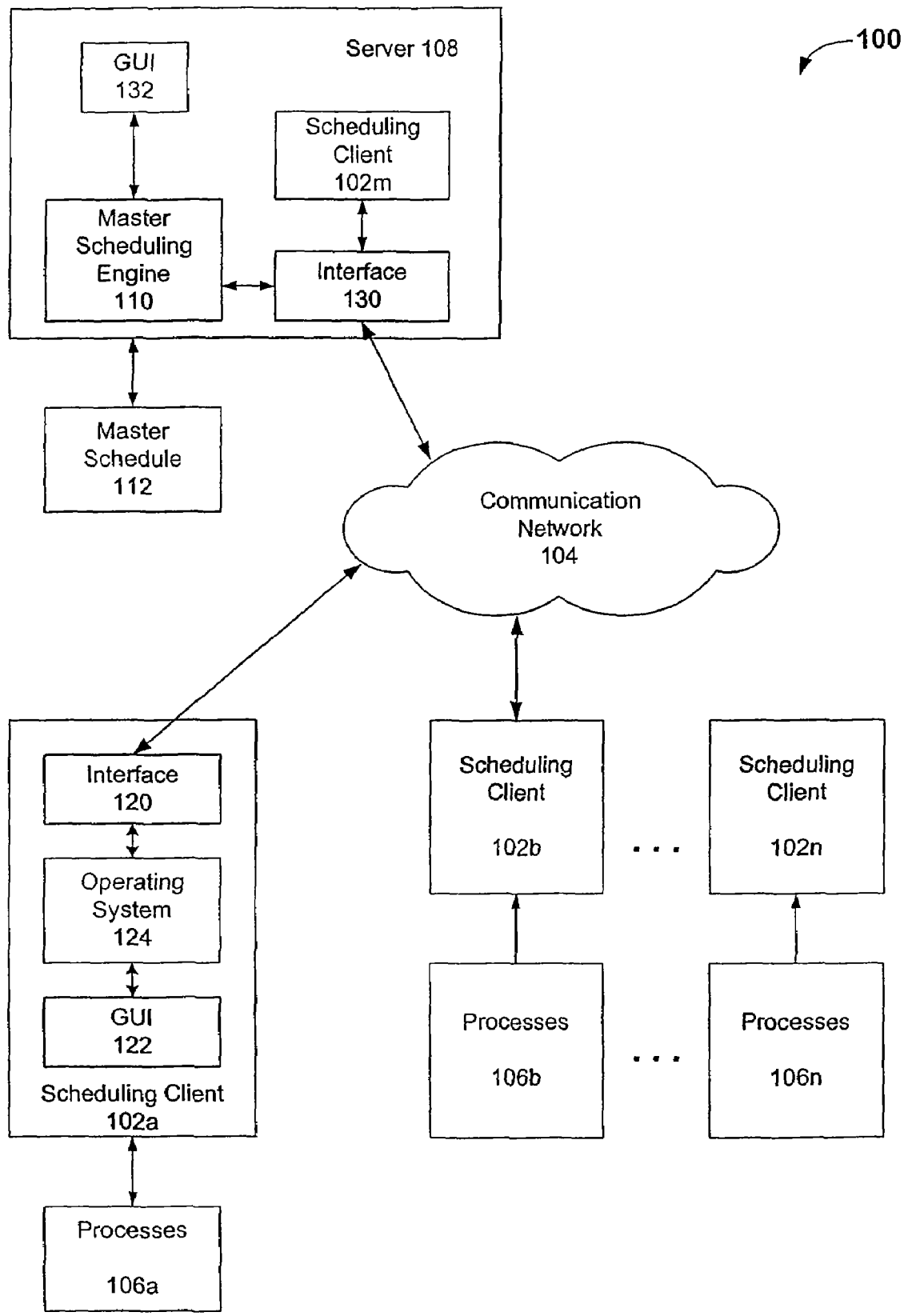
FIG. 1 is an illustration of a system according to an embodiment of the present invention.

FIG. 1 is an illustration of a system 100 according to an embodiment of the present invention. System 100 includes a plurality of client computers 102a-102n (also referred to as client or clients 102) coupled to a computer communication network 104. A plurality of processes or tasks 106a-106n are respectively assigned to client computers 102a-102n. Each client (for example, client 102a) can execute one or more processes (for example, processes 106a) assigned to the client.

A server computer 108 (also referred to as server 108) is coupled to computer communication network 104. Server computer 108 includes a Master Scheduling Engine (MSE) 110 for scheduling processes 106a-106n to execute on associated clients 102a-102n, according to the present invention. Note that clients 102 can be thought of as "scheduling clients" because the clients are schedule clients of the MSE 110. However, clients 102 can operate as both servers or clients in a server-client environment, such as the Internet. A master schedule 112, residing in or external to server 108, is accessible to server 108. According to the present invention, server 108 generates master schedule 112 and accesses the contents of master schedule 112 to facilitate the scheduling of processes 106 for execution. Server 108 communicates with clients 102 over communication network 104, which can be any known computer communication network, including the Internet, a company intranet, a local area network (LAN), a wide area network (WAN), the Public Switch Telephone Network (PSTN), and so on. An exemplary network and computer environment in which the present invention can be implemented is described in further detail below, in connection with FIGS. 5A, 5B and 5C.

A logical configuration of client 102a, in an embodiment of the present invention that is typical of the other clients in system 100, is depicted in FIG. 1. Client 102a includes a message interface 120 for sending information (such as messages) to and receiving information from server 108 and the other clients via communication network 104. In an embodiment of the present invention, client 102a may also include a Graphical User Interface (GUI) 122 for permitting a user to enter information and commands into client 102a and for displaying information to the user. Client 102a operates (for example, executes processes) under an operating system 124. Operating system 124 responds to user commands entered via GUI 102a, and also responds to commands and/or messages received from server 108 via message interface 120.

An exemplary logical configuration of server 108 is also depicted in FIG. 1. Server 108 includes a message interface 130 for sending information (such as messages) to and receiving information from clients 102 via communication network 104. Server 108 also includes a GUI 132 for permitting a user to enter information and commands into server 108 and for displaying information to the user. Server GUI 132 and client GUI 122 can be, for example, web-based or browser GUIs. The MSE 110 is responsive to information including messages received from clients 102 over communication network 104 (and via interface 130), and from commands and information input to server 108 via GUI 132. The MSE 110 generates master schedule 112 in response to such user input and the information received from clients 102.

Each client executes one or more processes 106, as mentioned above. A process is an executable program, such as a compiled program or "executable", a program script, and any other type of executable program that can be executed on a computer, as would be apparent to one skilled in the relevant art. Such processes are often also referred to as "tasks", as is known in the art. A client (for example, client 102a) can execute a process after the process has been installed on the client computer. Installing a process in a client computer typically includes loading the process, for example, a compiled program, into client computer memory such that the client computer can execute the process to produce a useful result. Typically, the installed process is executed under the supervision of the client OS. Each of processes 106 (for example, process 106a) can be several processes installed on an associated client 102 (for example, client 102a).

As will be appreciated by those skilled in the relevant art(s), the configuration of system 100 may include at least one scheduling client 102m (and associated processes) which is physically located on the same computer as server 108 as shown in FIG. 1.

In an embodiment of the present invention, at least two of client computers 102a-102n are distinct from one another. This means each of the at least two client computers includes, for example, its own processing unit for executing program instructions, memory, user interface hardware (such as, a keyboard), display, logical configuration (for example, its own operating system), etc. For example, client computer 102a comprises a first computer workstation or platform, while client computer 102b comprises a second computer platform. Also in accordance with the present invention, the two distinct clients have different operating systems. For example, client 102a runs under a Microsoft Windows NT operating system (OS), while client 102b runs under any Unix based OS. Thus, system 100 has a "cross-platform" configuration, meaning that a plurality of processes can execute on a plurality of associated clients, each having different operating systems. It is envisioned that system 100 includes many distinct computer platforms that respectively operate under many different operating systems. The different operating systems can be any presently known or future developed operating systems.

It is important to note that while the present invention is described in terms of the above example, this is for convenience only and is not intended to limit the application of the present invention. In fact, after reading the following description, it will be apparent to one skilled in the relevant art(s) how to implement the following invention in alternative embodiments. For example, client computers 102a-n may each operate under a first operating system (e.g., Unix), while server 108 may operate under a second, distinct operating system (e.g., Windows NT).

Consider such an exemplary "cross-platform" configuration of system 100, wherein client 102a is a Microsoft Windows NT platform and client 102b is a Unix based platform. In this exemplary configuration, processes 106a can execute on client 102a only under the Windows NT OS, and processes 106b can execute on client 102b only under the Unix based OS. Accordingly, only Windows NT compatible processes (processes 106a) and only Unix compatible processes (processes 106b) can run on clients 102a and 102b, respectively. In the present invention, the MSE 110 advantageously performs cross-platform scheduling, whereby Windows NT compatible processes 106a and Unix compatible processes 106b are scheduled to execute on respective compatible clients 102a and 102b in accordance with a user defined executing sequence captured in master schedule 112, as will be described in further detail below. In the present invention, the cross-platform processes 106 are advantageously scheduled to execute on associated clients 102 from one central controller (that is, the MSE 110).

Figure 2:
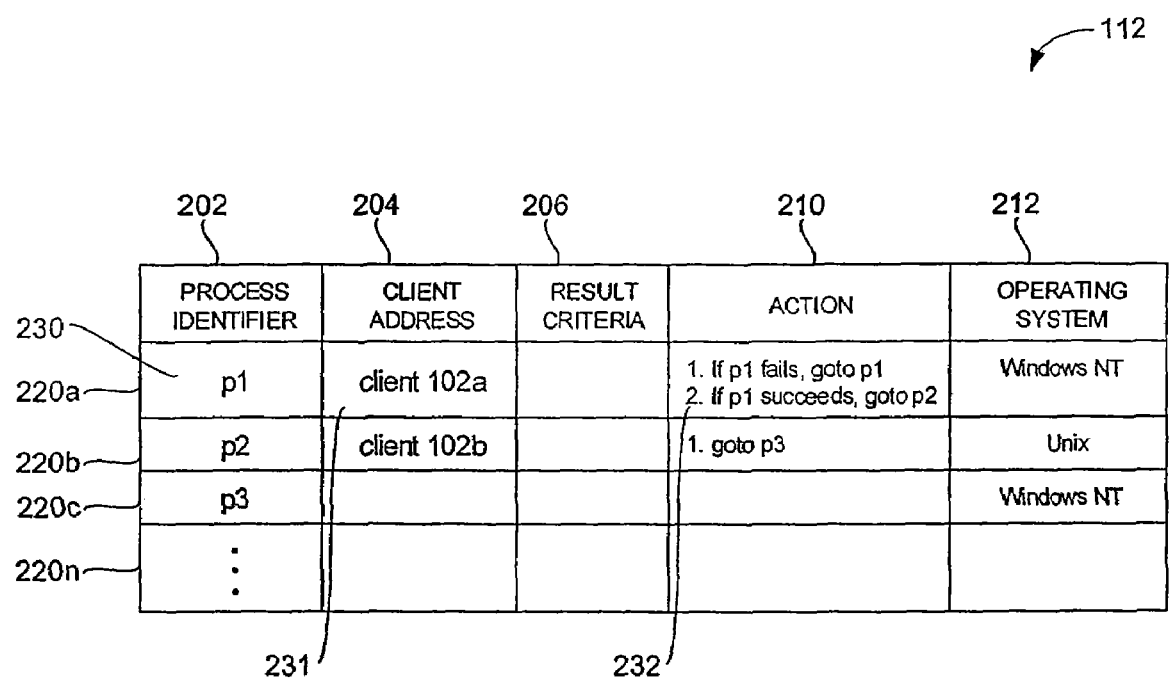
FIG. 2 is an illustration of an exemplary master schedule used in the present invention to schedule processes.

FIG. 2 is an illustration of an exemplary master schedule 112. Master schedule 112 includes a process identifier column 202 for listing process identifiers identifying all of the processes 106 installed in and to be executed on associated clients 102. Master schedule 112 includes a client address column 204 for listing client network addresses corresponding to clients 102, to enable server 108 to communicate with each client. Similarly, a network address of server 108 is known to each client 102. Master schedule 112 includes a result criteria column 206 for listing criteria associated with the execution of corresponding processes on clients 102. Such criteria can include, for example, expected outcomes or results produced by processes when the processes execute to successful completions.

Master schedule 112 also includes an action column 210 for listing actions, for example branching commands, that define the sequence in which processes 106a-106n are to be executed (this is also referred to as the "executing sequence" of processes 106). The actions can be conditional, that is, dependent upon the outcome or results reported by an executed process. Alternatively, the actions can be unconditional, that is, not dependent on such an outcome. Master schedule 112 can optionally include an operating system column 212 for listing the operating systems under which the processes listed in column 202 will run. In an embodiment, master schedule may also include a column (not shown in FIG. 2) for listing process priorities corresponding to each of the identified process. For example, processes can be identified as having high, medium or low execution priorities.

Master schedule 112 includes a plurality of records or rows 220a-220n, each corresponding to a process that is scheduled to be executed in system 100. Processes that are to be installed and executed are also referred to as "jobs". Each row includes a plurality of fields for respectively storing information associated with columns 202-212, described above. For example, row 220a includes a field 230 for storing a process identifier "p1" identifying one of the process 106a in FIG. 1. Row 220a includes a field 231 for storing an exemplary client address corresponding to client 102a. Row 220a also includes a field 232 for storing the following exemplary actions:

1. if p1 fails, goto p1
2. if p1 successful, goto p2

The above listed actions, along with the result criteria information of column 206, define conditional inter-relationships between the processes p1, p2 and p3. The format of the above actions as listed in FIG. 2 is exemplary, and therefore any format can be used that would be apparent to one skilled in the relevant art based on the descriptions provided above and below. The actions (for example, actions (1) and (2)) direct the MSE 110 to cause the processes identified in column 202 of master schedule 112 to execute in a defined executing sequence. Assume, for example, process p1 is currently executing on Windows NT client 102a, and process p2 is installed and waiting to be executed on Unix based client 102b. Action (1) above directs MSE 110 to re-execute process p1 on client 102b when it is determined that process p1 failed because, for example, p1 did not successfully execute to completion or returned erroneous data to a monitoring function of the MSE 110. On the other hand, action (2) directs MSE 110 to execute process p2 on client 102b when it is determined, for example, that process p1 executed to successful completion. In an another example scenario, the actions could be redefined to direct the MSE 110 to execute process p2 when it is determined p1 has executed successfully, or to execute p3 instead of p2, when it is determined p1 did not execute successfully. Many other conditional, process executing sequence permutations and combinations are possible by simply redefining the above described master schedule, as would be apparent to one skilled in the relevant art based on the above description. For example, as will be appreciated by those skilled in the relevant art(s), master schedule 112 may include timing information which would allow MSE 110 to execute processes on a pre-determined schedule (e.g., hourly, daily, weekly, etc.).

Figure 3:
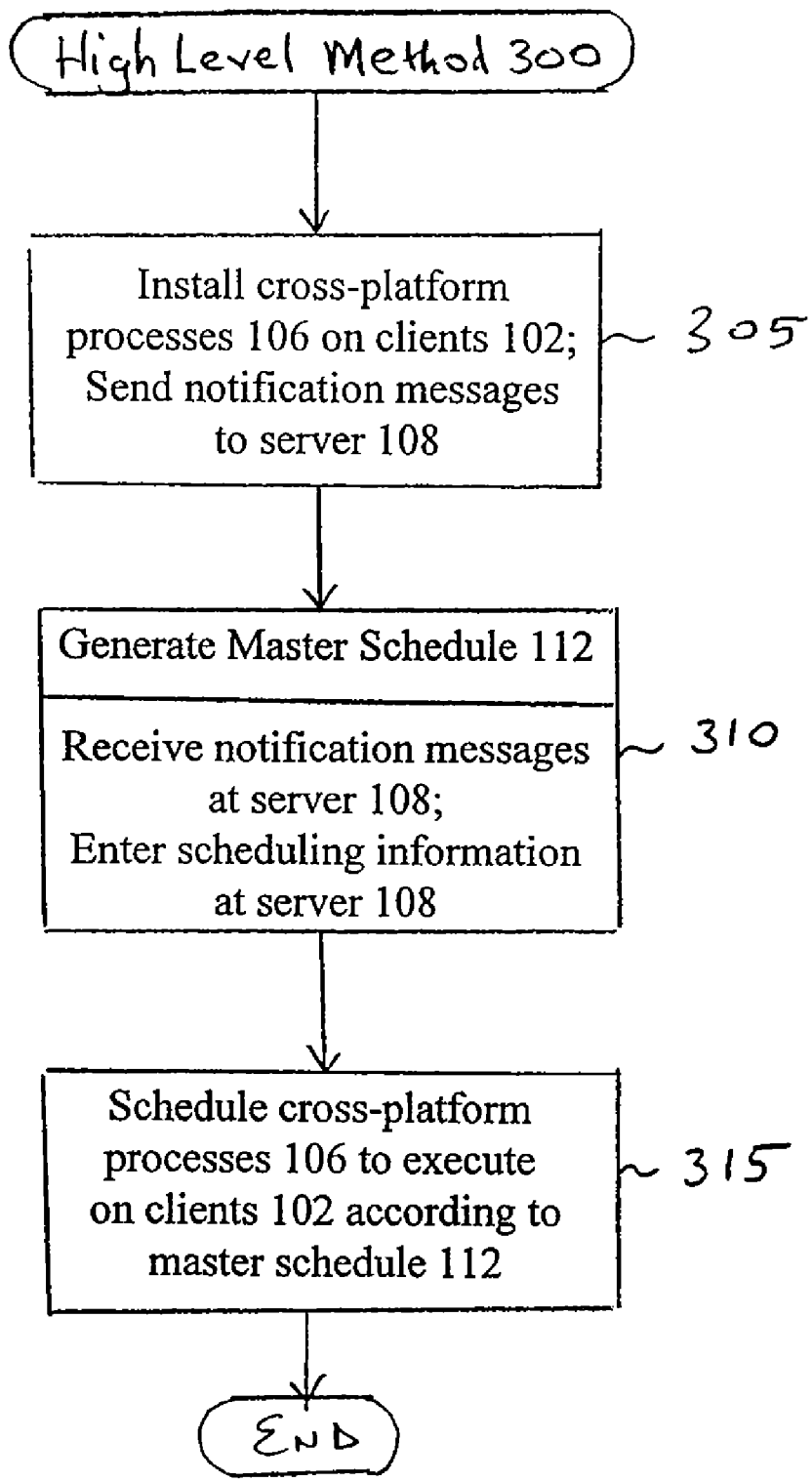
FIG. 3 is a flow chart of a high-level method according to an embodiment of the present invention.

FIG. 3 is a flow chart of a high-level method 300 according to an embodiment of the present invention. Method 300 is described with reference to system 100 and under the assumption that at least two of clients 102 are distinct and are operating under different operating systems, as described above.

Again, the present invention is described under this assumption for convenience only and is not intended to limit the application of the present invention. As will be appreciated by one skilled in the relevant art(s), all client computers 102a-n may each operate under a first operating system (e.g., Unix), while server 108 may operate under a second, distinct operating system (e.g., Windows NT). In fact, as will also be appreciated by one skilled in the relevant art(s), the configuration of system 100 may include scheduling clients 102a and 102b (and associated their processes) which are physically located (and executing) on the same computer.

Returning to FIG. 3, method 300 begins at a step 305 when processes 106a-106n are installed to execute on respective clients 102a-102n. In an example scenario, one or more Windows NT compatible processes 106a are installed on Windows NT based client 102a, and one or more Unix compatible processes are installed on Unix based client 102b. Whenever a process is installed on a client 102 in the present invention, the client sends a notification message to server 108 indicating the installed process needs to be scheduled for execution. The notification message includes a process identifier (for example "p1"). In an alternative embodiment, server 108 will assign the process identifier. In yet another embodiment, an OS type identifier (for example, "Unix") identifying the type of OS residing on the client is also included in the notification message from client 102 to server 108.

At a next step 310, server 108 receives the notification message or messages corresponding to each installed process. Such notification messages are displayed to a user at server 108. The user enters information and commands into server 108 as necessary to construct master schedule 112. Such information includes the information required to populate the fields of each of rows 220a-220n, where each row corresponds to an installed process that needs to be scheduled for execution. For example, the fields of results criteria column 206 are populated with result criteria. Such criteria includes success criteria by which the successful execution of the corresponding processes can be judged or determined. The fields of action column 210 are populated with actions, such as branch commands similar to the action (1) and action (2) mentioned above, defining executing sequences of the installed processes (identified in column 202 of master schedule 112). The user can also enter process executing priorities for the installed processes into master schedule 112. The end result of step 310 is the generation of master schedule 112. Master schedule 112 links together the installed processes, associated with process identifiers in column 202, in such a way as to define executing sequences for the cross-platform processes 106. It is to be understood that the particular form of the construct used to link processes 106 together in master schedule 112 (such as goto statements) is not limited to those depicted in FIG. 2. Any construct, such as linked links, and the like, that would be apparent to one skilled in the relevant art, can be used.

Figure 4:
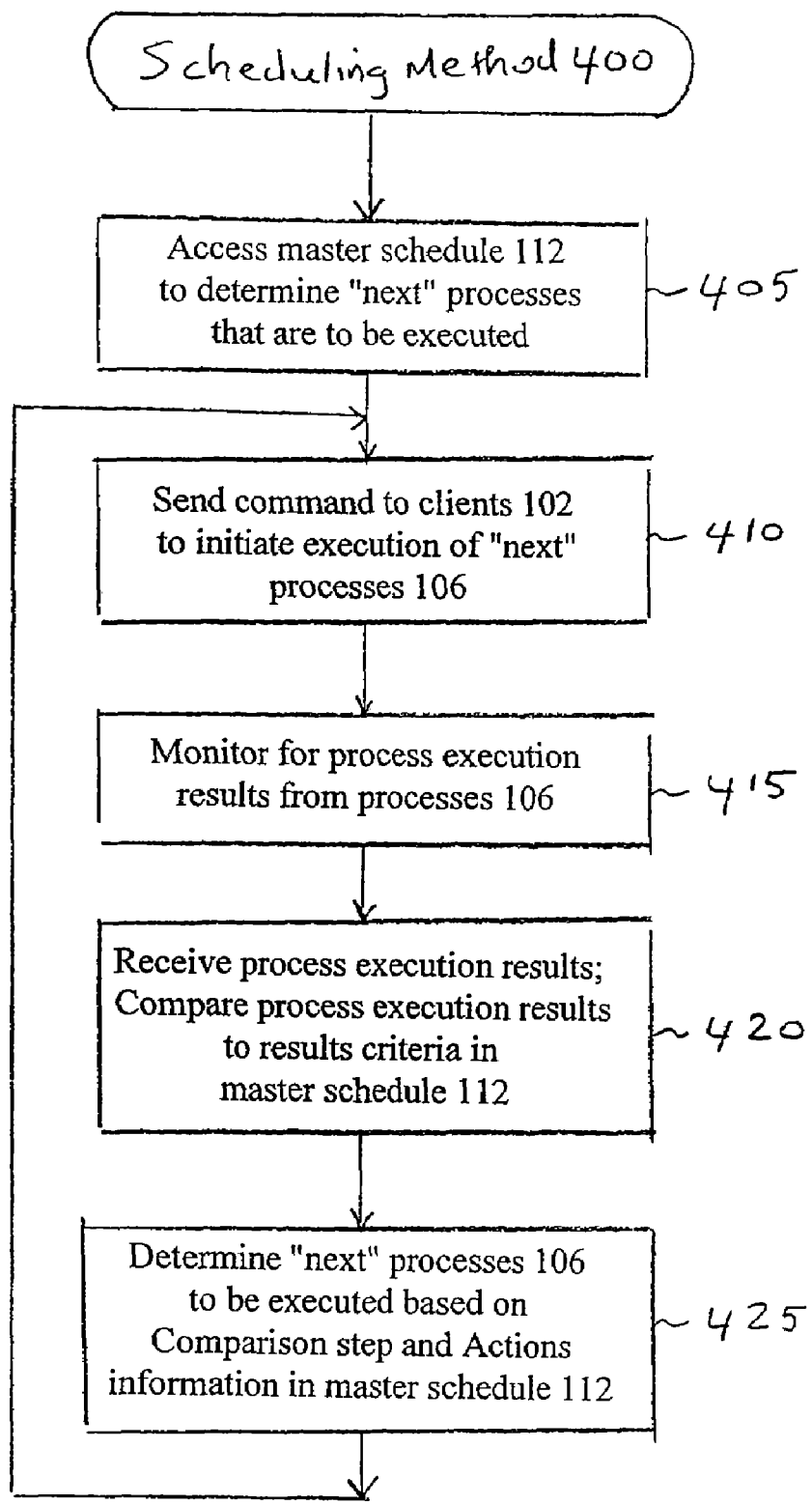
FIG. 4 is an exemplary series of detailed method steps corresponding to a scheduling method step of FIG. 3.

At a next, run-time step 315, the MSE 110 schedules cross-platform processes 106 to execute on clients 102. To do this, the MSE 110 accesses master schedule 112 to thereby schedule processes 106 to execute according to the executing sequence defined by the master schedule. Run-time scheduling step 315 is now described in further detail with reference to FIG. 4, wherein exemplary detailed method steps 400 corresponding to method step 315, are depicted.

At an initial step 405, the MSE 110 accesses master schedule 112 to determine which one of the processes 106 (for example process p1) is to be executed "next". Depending on the processing requirements associated with system 100, master schedule 112 can indicate that several processes 106 are to be executed concurrently, "next". Initially, the "next" process is the first process (or processes) that is to be executed in master schedule 112 (for example, process p1).

At a next step 410, the MSE 110 sends an "initiate execution command" to each of the clients 102 (for example, client 102a) hosting an installed process that is to be executed "next". This command prompts the operating system of the client that receives the command to initiate execution of the process identified in the command.

At a next step 415, the MSE 110 monitors interface 130 for an incoming status message from any of clients 102. Each status message includes a process identifier and a client identifier respectively identifying the sending client and associated process. The status message also includes process execution results produced by the associated process during execution of the process, or when the process completes execution. The process execution results can indicate, for example, that the process successfully executed to completion, or that the process did not successfully execute to completion.

At a next step 420, after receiving such a status message, the MSE 110 uses the process identifier included in the received status message to access and retrieve the appropriate result criteria in the appropriate row of the master schedule 112. The MSE 110 compares the retrieved result criteria to the process execution results included in the status message.

At a next step 425, the MSE 110 determines which process scheduling action is appropriate based on comparison step 420 and the action information stored in action column 210 of master schedule 112, as described above in connection with the FIG. 2. In other words, the MSE 110 determines a "next" process to be executed, and flow control proceeds back to step 410. In this manner, master schedule 112 and the MSE 110 together form a dynamic and flexible, centralized, cross-platform process scheduling mechanism, whereby a process executing sequence can be based on execution results produced by the processes identified in the master schedule. In other words, the executing sequence can be adjusted based on the execution results, the user defined result criteria, and the actions defined in the master schedule 112.

In another embodiment, the MSE 110 determines which process scheduling action is appropriate based on the above mentioned factors, and in addition, on a process priority stored in master schedule 112. For example, the MSE 110 may cause a high priority "next" process to preempt a low priority "next" process on one of clients 102.

In yet another embodiment, the MSE 110 monitors a processing loading or "busy-state" of each of clients 102. In this embodiment, the MSE 110 determines which process scheduling action is appropriate based on the factors described above in connection with method steps 420 and 425, and in addition, on the "busy-state" of each client. This embodiment gives the MSE 110 the flexibility to transfer "next" processes from busy clients to available clients, and to initiate execution of the transferred "next" processes on the available clients. To do this, the MSE 110 determines which "next" processes are scheduled to be executed on busy clients. The MSE 110 also determines which clients are available to execute processes. Assuming the MSE 110 determines that one or more clients are available, the MSE sends "process transfer" commands to the busy clients associated with the "next" processes. Each process transfer command received by a busy client directs the busy client to transfer its "next" installed process to an available client identified by a client destination address in the transfer command. Each available destination client has an operating system compatible with the busy client from where the process is being transferred. MSE 110 is able to determine such compatible client transfer pairs based on the OS type information in column 212 of master schedule 112. When the "next" process has been successfully transferred from the busy client to the available client, then the MSE 110 initiates execution of the transferred "next" process on the available client.

With reference to FIG. 1 an example cross-platform scheduling scenario is now described. The example scenario includes the following client/process configuration. Client 102a is an Internet Web-server having a Sun/Solaria Unix based operating system. An Internet information gathering process installed on client 102a (e.g., a Web search engine or crawler) is used to automatically search Internet-web sites for predetermined information, collect "found" information, and send the found information to another computer within the same network. All of this is referred to as "job1."

In the example scenario, the particular web-information collected by the Internet information gathering process of client 102a is passed to client 102b. Client 102b is a work station operating under the Windows NT OS. A chart generating process installed on client 102b is used to generate bit mapped charts based on the web-information passed to client 102b. The charts are displayed to a user. This is referred to as "job2". The chart generating process of client 102b submits queries to a database application (this is referred to as "job3") residing on client 102c, which is also a Windows NT based client.

In this example scenario, a master schedule 112 is generated to schedule the following conditional executing sequence of processes (i.e., job1, job2 and job3):

1. job1 (Execute the information gathering process on client 102a to collect web information and then pass the gathered web information to client 102b);

2. If job1 successful, goto job2 (concurrently execute the chart generating process on client 102*b* and the database application on client 102*c*, to generate and display charts), If job1 unsuccessful, goto job1 (re-execute job1 one time only); and 3. If job2 successful, then DONE, If job2 unsuccessful, then ERROR.

In yet another, example cross-platform scenario, a Unix based client 102*a* executes the web-based information gatherer (job1) described above, a Unix based client 102*b* executes a parser to parse the gathered information (job2), and a Windows NT based client 102*c* executes an email generator to generate email messages available to a user (job3 and job4). The jobs are scheduled to execute according to the following master schedule:

1. job1 (execute the information gatherer);
2. If job1 successful, goto job2 (parse the gathered data); and
3. If job2 successful, goto job3 (generate an email Success message), If job1 unsuccessful, goto job4 (generate an email Error message).

In the above example scenarios, only a single job is scheduled to execute on each distinct client 102. However, in an alternate embodiment of the present invention, master schedule 112 can be constructed such that several jobs are queued for scheduled execution on one or more of clients 102.

Example Network Environment

The present invention can be implemented in any communication network, such as, the Internet, which supports interactive services and applications. In particular, the present invention can be implemented in any Web service, preferably a Web service supporting secure transactions, such as, the Secure Socket Layer (SSL) protocol and/or using a Secure HyperText Transport Protocol (S-HTTP). In one example, the present invention is implemented in a multi-platform (platform independent) programming language such as Java. Java-enabled browsers are used, such as, Netscape, HotJava, and Microsoft Explorer browsers. Active content Web pages can be used. Such active content Web pages can include Java applets or ActiveX controls, or any other active content technology developed now or in the future. The present invention, however, is not intended to be limited to Java or Java-enabled browsers, and can be implemented in any programming language and browser, developed now or in the future, as would be apparent to a person skilled in the art given this description. Further, the present invention is not intended to be limited to a Web-based implementation or environment and can be implemented in any communication network now or in the future, as would be apparent to a person skilled in the art given this description. Even further, the present invention can operate in the absence of a network, for example, on a computer not connected with a network.

Figure 5A:
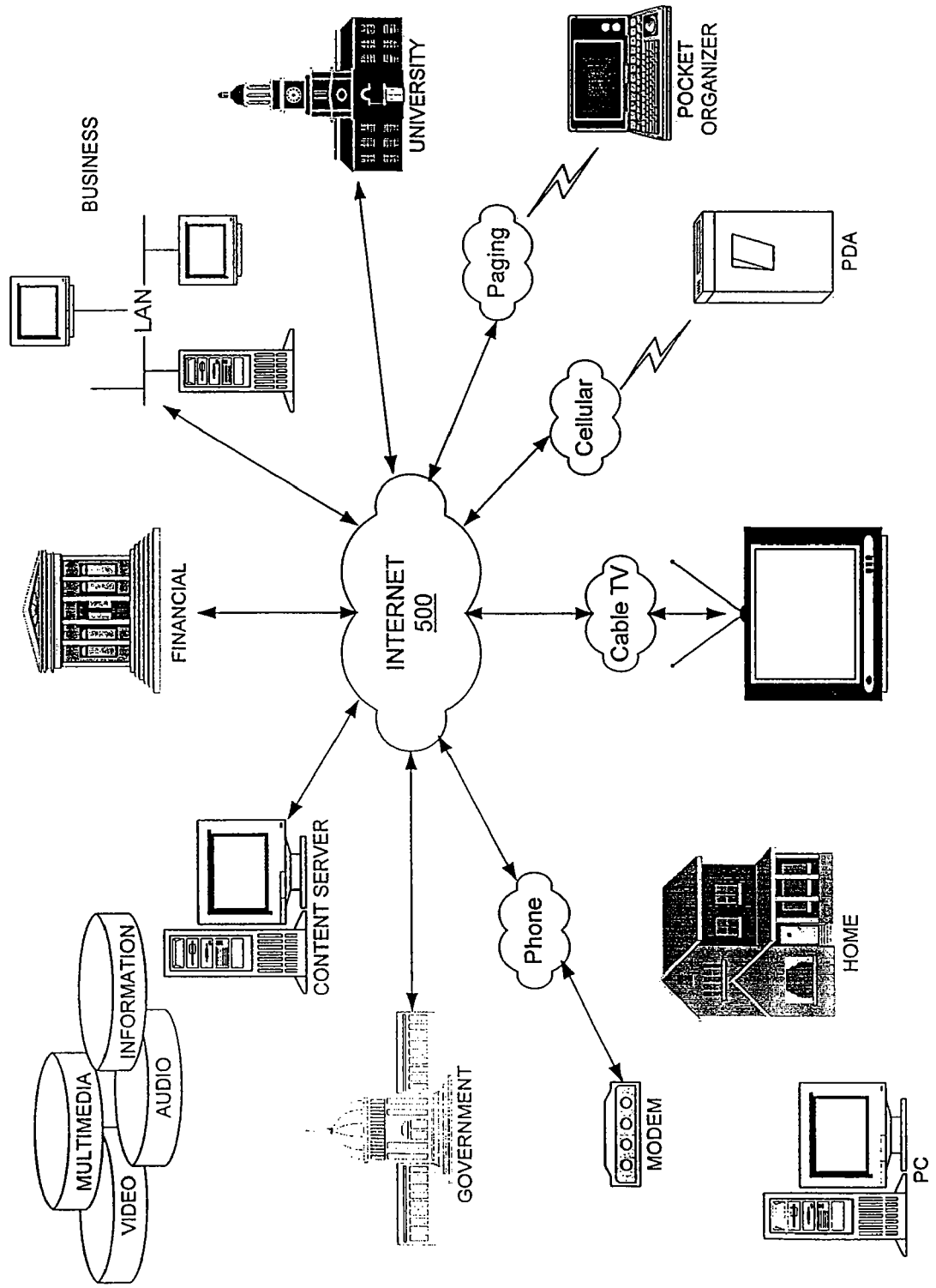
FIG. 5A is a diagram of an example internetwork environment according to the present invention.

FIG. 5A is a diagram of an example internetwork environment according to the present invention. FIG. 5A shows a communication network or combination of networks (Internet) 500 (corresponding to communication network 104 of FIG. 1) which can support the invention. Internet 500 consists of interconnected computers which supports communication between many different types of users including businesses, universities, individuals, government, and financial institutions. Internet 500 supports many different types of communication links implemented in a variety of architectures. For example, voice and data links can be used including phone, paging, cellular, and cable TV (CATV) links. Terminal equipment can include local area networks, personal computers with modems, content servers of multi-media, audio, video, and other information, pocket organizers, personal digital assistants (PDAs), and set-top boxes.

Figure 5B:
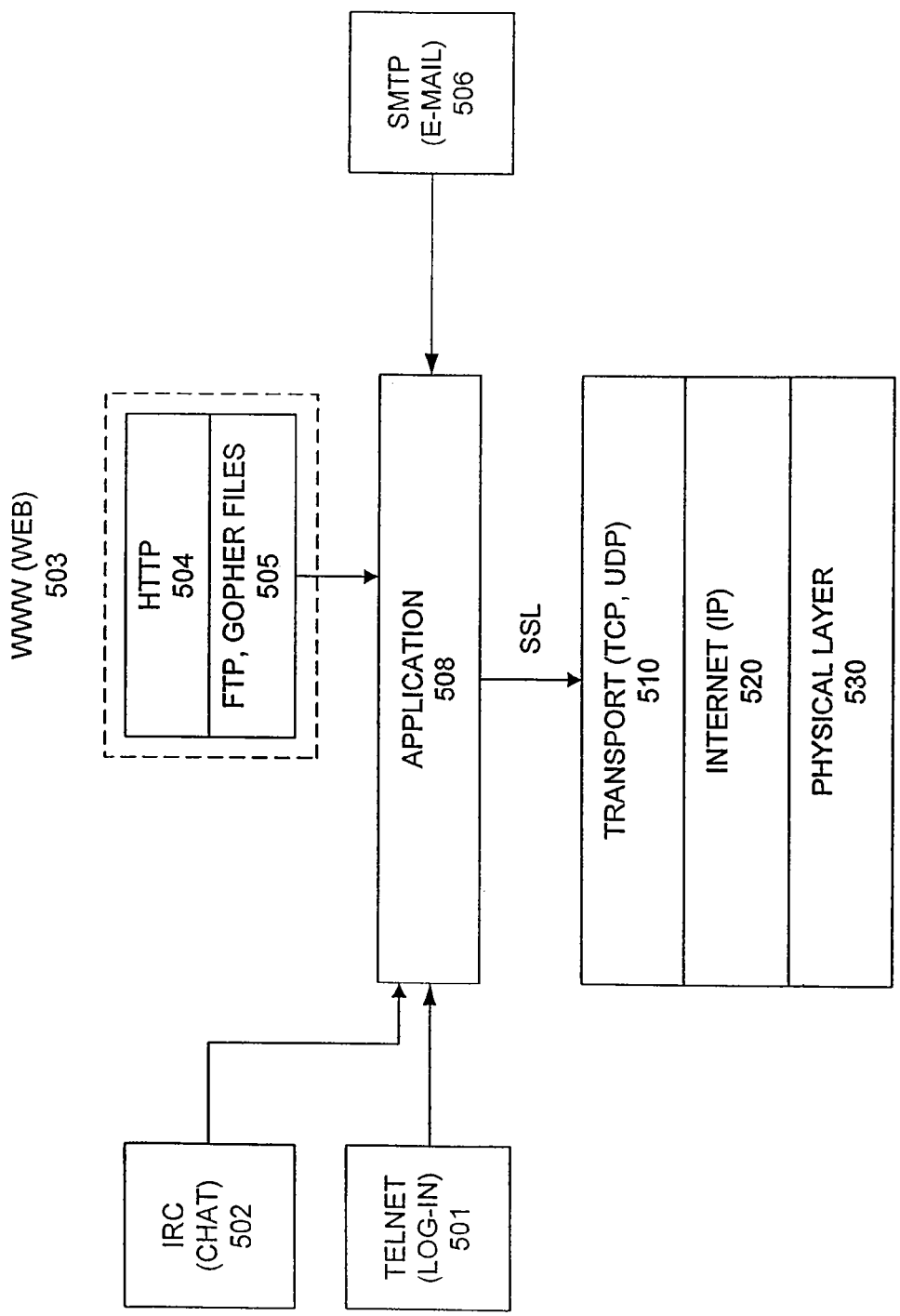
FIG. 5B is an illustration of a simplified four-layered communication model supporting Web commerce including an application layer, a transport layer, an Internet layer, and a physical layer.

Communication over a communication network such as, Internet 500, is carried out through different layers of communication. FIG. 5B shows a simplified four-layered communication model supporting Web commerce including an application layer 508, transport layer 510, Internet layer 520, physical layer 530. As would be apparent to a person skilled in the art, in practice, a number of different layers can be used depending upon a particular network design and communication application. Application layer 508 represents the different tools and information services which are used to access the information over the Internet. Such tools include, but are not limited to, telenet log-in service 501, IRC chat 502, Web service 503, and SMTP (Simple Mail Transfer Protocol) electronic mail service 506. Web service 503 allows access to HTTP documents 504, and FTP and Gopher files 505. A Secure Socket Layer (SSL) is an optional protocol used to encrypt communications between a Web browser and Web server.

Description of the example environment in these terms is provided for convenience only. It is not intended that the invention be limited to application in this example environment. In fact, after reading the following description, it will become apparent to a person skilled in the relevant art how to implement the invention in alternative environments.

Example Computer System

Figure 5C:
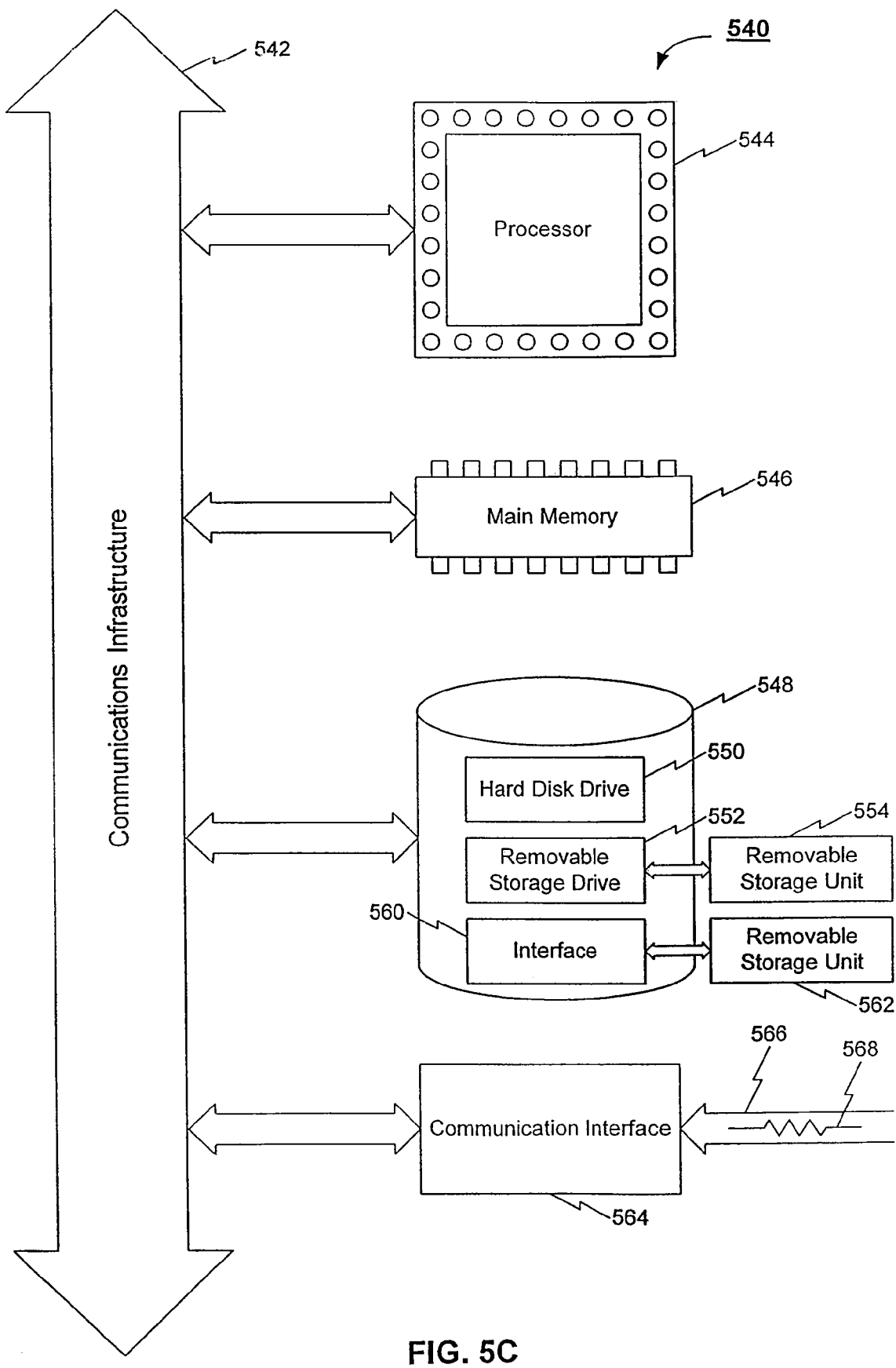
FIG. 5C is an exemplary computer architecture on which the present invention can be implemented.

An example of a computer system 540 is shown in FIG. 5C. The computer system 540 represents any single or multi-processor computer. Single or multi-tasking computers can be used. Unified or distributed memory systems can be used.

Computer system 540 includes one or more processors, such as processor 544. In one embodiment, computer system 540 corresponds to server 108 of FIG. 1, wherein scheduling engine 110 (also referred to as scheduler 110) comprises one or more processors 544 for executing software implemented methods 300 and 400 as described above, and as appropriate. Each processor 544 is connected to a communication infrastructure 542 (e.g., a communications bus, cross-bar, or network). Various software embodiments are described in terms of this exemplary computer system. After reading this description, it will become apparent to a person skilled in the relevant art how to implement the invention using other computer systems and/or computer architectures.

Computer system 540 also includes a main memory 546, preferably random access memory (RAM), and can also include a secondary memory 548. The secondary memory 548 can include, for example, a hard disk drive 552 and/or a removable storage drive 552, representing a floppy disk drive, a magnetic tape drive, an optical disk drive, etc. The removable storage drive 552 reads from and/or writes to a removable storage unit 554 in a well known manner. Removable storage unit 554 represents a floppy disk, magnetic tape, optical disk, etc., which is read by and written to by removable storage drive 552. As will be appreciated, the removable storage unit 554 includes a computer usable storage medium having stored therein computer software and/or data.

In alternative embodiments, secondary memory 560 may include other similar means for allowing computer programs or other instructions to be loaded into computer system 540. Such means can include, for example, a removable storage unit 562 and an interface 560. Examples can include a program cartridge and cartridge interface (such as that found in video game devices), a removable memory chip (such as an EPROM, or PROM) and associated socket, and other removable storage units 562 and interfaces 560 which allow software and data to be transferred from the removable storage unit 562 to computer system 540.

Computer system 540 can also include a communications interface 564. Communications interface 564 allows software and data to be transferred between computer system 540 and external devices via communications path 566. Examples of communications interface 564 can include a modem, a network interface (such as Ethernet card), a communications port, etc. Software and data transferred via communications interface 564 are in the form of signals 568 which can be electronic, electromagnetic, optical or other signals capable of being received by communications interface 564, via communications path 566. Note that communications interface 564 provides a means by which computer system 540 can interface to a network such as the Internet.

The present invention can be implemented using software running (that is, executing) in an environment similar to that described above with respect to FIG. 5A. In this document, the term "computer program product" is used to generally refer to removable storage unit 554, a hard disk installed in hard disk drive 552, or a carrier wave carrying software over a communication path 566 (wireless link or cable) to communication interface 564. A computer useable medium can include magnetic media, optical media, or other recordable media, or media that transmits a carrier wave or other signal. These computer program products are means for providing software to computer system 540.

Computer programs (also called computer control logic) are stored in main memory 546 and/or secondary memory 548. Computer programs can also be received via communications interface 564. Such computer programs, when executed, enable the computer system 540 to perform the features of the present invention as discussed herein. In particular, the computer programs, when executed, enable the processor 544 to perform the features of the present invention, as related to proximity searching. Accordingly, such computer programs represent controllers of the computer system 540.

The present invention can be implemented as control logic in software, firmware, hardware or any combination thereof. In an embodiment where the invention is implemented using software, the software may be stored in a computer program product and loaded into computer system 540 using removable storage drive 552, hard drive 550, or interface 560. Alternatively, the computer program product may be downloaded to computer system 540 over communications path 566. The control logic (software), when executed by the one or more processors 544, causes the processor(s) 544 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method, executing on a scheduling computer, for scheduling execution of programs, comprising:
   scheduling a first computer communicatively coupled with the scheduling computer to execute a first program, wherein the first computer has a first operating system;
   receiving at the scheduling computer a result from the first computer, wherein the result from the first computer is based at least in part upon the execution of the first program by the first computer; and
   scheduling a second computer communicatively coupled with the scheduling computer to execute a second program in response to a determination that the result from the first computer meets a criterion, wherein the second computer has a second operating system and the second operating system is different from the first operating system.

2. The method of claim 1, wherein said receiving comprises receiving an indication that execution of the first program on the first computer was successful.

3. The method of claim 1, wherein said receiving comprises receiving an indication that execution of the first program on the first computer was unsuccessful.

4. The method of claim 1, further comprising receiving at the scheduling computer an indication from the first computer that the first computer is ready to be scheduled for the execution of the first program.

5. The method of claim 4, wherein the indication includes an identification of the first program.

6. The method of claim 4, wherein the indication includes an identification of the first operating system.

7. The method of claim 4, further comprising assigning an identification of the first program.

8. The method of claim 4, further comprising displaying the indication at the scheduling computer.

9. The method of claim 1, further comprising receiving information entered at the scheduling computer to define the criterion.

10. The method of claim 1, wherein said scheduling the second computer to execute the second program comprises scheduling the second computer to execute the second program in response to a determination that the result from the first computer meets the criterion and a priority of the second program is higher than a priority of a third program.

11. The method of claim 1, wherein said scheduling the second computer to execute the second program comprises scheduling the second computer to execute the second program in response to a determination that the result from the first computer meets the criterion and a load of the second computer is less than a load of a third computer, wherein the third computer has a third operating system and the third operating system is the same as the second operating system.

12. A scheduling computer, comprising:
   a memory configured to store a criterion; and
   a processor communicatively coupled with the memory and configured to schedule a first computer communicatively coupled with the scheduling computer to execute a first program, to receive a result from the first computer, and to schedule a second computer communicatively coupled with the scheduling computer to execute a second program in response to a determination that the result from the first computer meets the criterion stored in the memory, wherein the result from the first computer is based at least in part on the execution of the first program by the first computer, the first computer has a first operating system, the second computer has a second operating system, and the second operating system is different from the first operating system.

13. The scheduling computer of claim 12, wherein the processor is further configured to store in the memory an indication from the first computer that the first computer is ready to be scheduled for the execution of the first program.

14. The scheduling computer of claim 13, wherein the processor is further configured to assign an identification of the first program.

15. The scheduling computer of claim 13, further comprising a display configured to display the indication.

16. The scheduling computer of claim 12, further comprising a user interface configured to receive user-entered information to define the criterion.

17. The scheduling computer of claim 12, wherein the processor is configured to schedule the second computer to execute the second program in response to a determination that the result from the first computer meets the criterion and a priority of the second program is higher than a priority of a third program.

18. The scheduling computer of claim 12, wherein the processor is configured to schedule the second computer to execute the second program in response to a determination that the result from the first computer meets the criterion and a load of the second computer is less than a load of a third computer.

19. A system for scheduling execution of programs, comprising:
 a memory configured to store a criterion, wherein the criterion relates to a result of execution of a first program by a first computer, and wherein the memory is independent of the first computer; and
 a processor communicatively coupled with the memory and configured to schedule the first computer to execute the first program and to schedule a second computer to execute a second program in response to a determination that the result from the first computer meets the criterion, wherein the processor is independent of the first computer, the first computer has a first operating system, the second computer has a second operating system, and the second operating system is different from the first operating system.

20. A system for scheduling execution of programs, comprising:
 a memory configured to store a criterion, wherein the criterion relates to a result of execution of a first program, wherein the memory is independent of a second computer; and
 a processor communicatively coupled with the memory and configured to schedule a first computer to execute the first program and to schedule the second computer to execute a second program in response to a determination that the result from the first computer meets the criterion, wherein the processor is independent of the second computer, the first computer has a first operating system, the second computer has a second operating system, and the second operating system is different from the first operating system.

21. A system for scheduling execution of programs, comprising:
 means for scheduling a first computer to execute a first program, wherein the first computer has a first operating system;
 means for receiving a result from the first computer, wherein the result from the first computer is based upon the execution of the first program by the first computer; and
 means for scheduling a second computer to execute a second program in response to a determination that the result from the first computer meets a criterion, wherein the second computer has a second operating system and the second operating system is different from the first operating system.

22. A computer-readable storage medium having stored thereon computer-executable instructions, execution of which by a computing device causes the computing device to perform operations comprising:
 scheduling a first computer in communication with the computing device to execute a first program, wherein the first computer has a first operating system;
 receiving a result from the first computer, wherein the result from the first computer is based upon the execution of the first program by the first computer; and
 scheduling a second computer to execute a second program in response to a determination that the result from the first computer meets a criterion, wherein the second computer has a second operating system and the second operating system is different from the first operating system.

* * * * *

UNITED STATES PATENT AND TRADEMARK OFFICE
CERTIFICATE OF CORRECTION

PATENT NO.        : 8,156,499 B2
APPLICATION NO.   : 12/331980
DATED             : April 10, 2012
INVENTOR(S)       : Foulger et al.

Page 1 of 2

It is certified that error appears in the above-identified patent and that said Letters Patent is hereby corrected as shown below:

On the Title Page, Item (56), under "OTHER PUBLICATIONS", in Column 2, Line 2, delete "p. 1-34." and insert -- pp. 1-34. --, therefor.

On Title Page 3, in Item (56), under "OTHER PUBLICATIONS", in Column 1, Line 2, delete ".htrnl" and insert -- .html --, therefor.

On Title Page 3, in Item (56), under "OTHER PUBLICATIONS", in Column 1, Line 3, delete "R.Rivest" and insert -- R. Rivest --, therefor.

On Title Page 3, in Item (56), under "OTHER PUBLICATIONS", in Column 1, Line 9, delete "p. 0420 Apr." and insert -- p. 0420, Apr. --, therefor.

On Title Page 3, in Item (56), under "OTHER PUBLICATIONS", in Column 1, Line 18, delete "1934-1" and insert -- 1934-1, --, therefor.

On Title Page 3, in Item (56), under "OTHER PUBLICATIONS", in Column 1, Line 27, delete "com Apr." and insert -- com, Apr. --, therefor.

On Title Page 3, in Item (56), under "OTHER PUBLICATIONS", in Column 1, Line 27, delete "p. 1-2]." and insert -- pp. 1-2] --, therefor.

On Title Page 3, in Item (56), under "OTHER PUBLICATIONS", in Column 1, Line 29, delete "p. 1-3]." and insert -- pp. 1-3]. --, therefor.

On Title Page 3, in Item (56), under "OTHER PUBLICATIONS", in Column 1, Line 30, delete "1989 2" and insert -- 1989, 2 --, therefor.

On Title Page 3, in Item (56), under "OTHER PUBLICATIONS", in Column 1, Line 31, delete "PCT/US01 12648" and insert -- PCT/US01/12648 --, therefor.

Signed and Sealed this
Twenty-fifth Day of September, 2012

David J. Kappos
*Director of the United States Patent and Trademark Office*

CERTIFICATE OF CORRECTION (continued)
U.S. Pat. No. 8,156,499 B2

On Title Page 3, in Item (56), under "OTHER PUBLICATIONS", in Column 2, Line 1, delete "Processing. ACM Computing Surveys." and insert -- Processing, ACM Computing Surveys, --, therefor.

On Title Page 3, in Item (56), under "OTHER PUBLICATIONS", in Column 2, Line 3, delete "PCT/US01 12510" and insert -- PCT/US01/12510 --, therefor.

On Title Page 3, in Item (56), under "OTHER PUBLICATIONS", in Column 2, Line 40, delete "Toursim" and insert -- Tourism --, therefor.

In the Specifications:

In Column 1, Lines 12-13, delete "60/421,780, filed Oct. 29, 2002," and insert -- 60/199,401, filed on Apr. 25, 2000, --, therefor.